March 26, 1929.   R. W. DIAMOND   1,706,400
FRAME FOR HOLDING TUBULAR FILTER ELEMENTS
Filed June 10, 1925   3 Sheets-Sheet 3
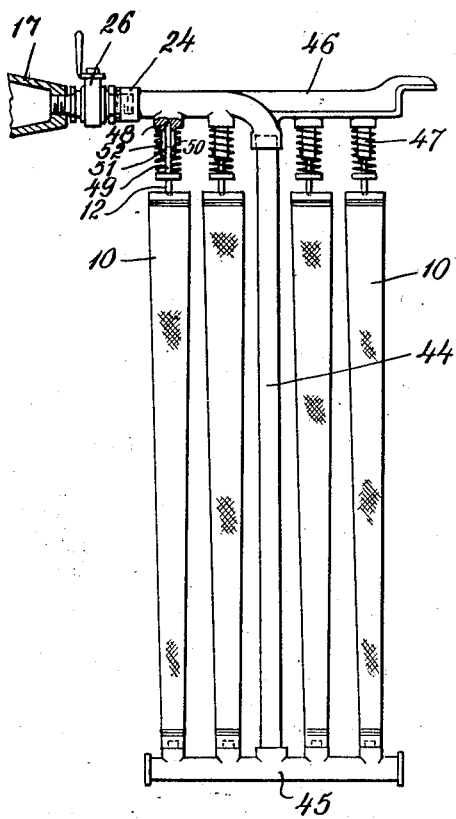
Fig. 6,
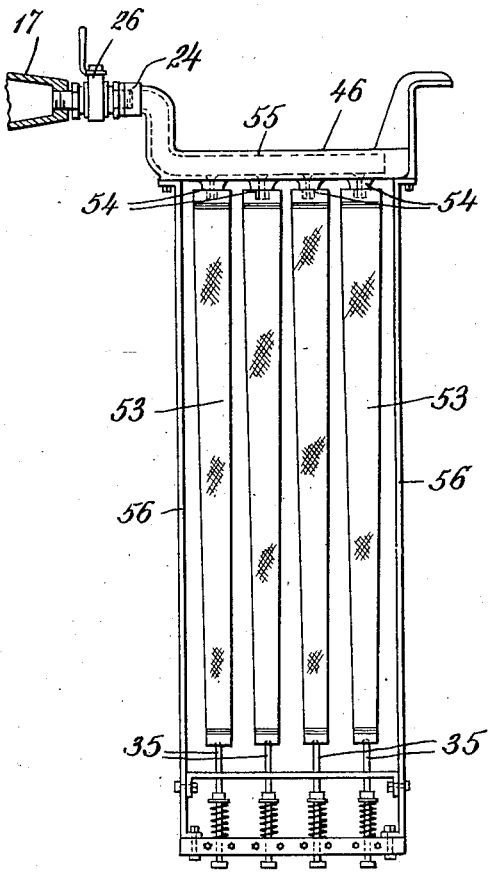
Fig. 7,
INVENTOR
R. W. Diamond
BY
Pennie, Davis, Marvin & Edmonds
his ATTORNEYS Patented Mar. 26, 1929.

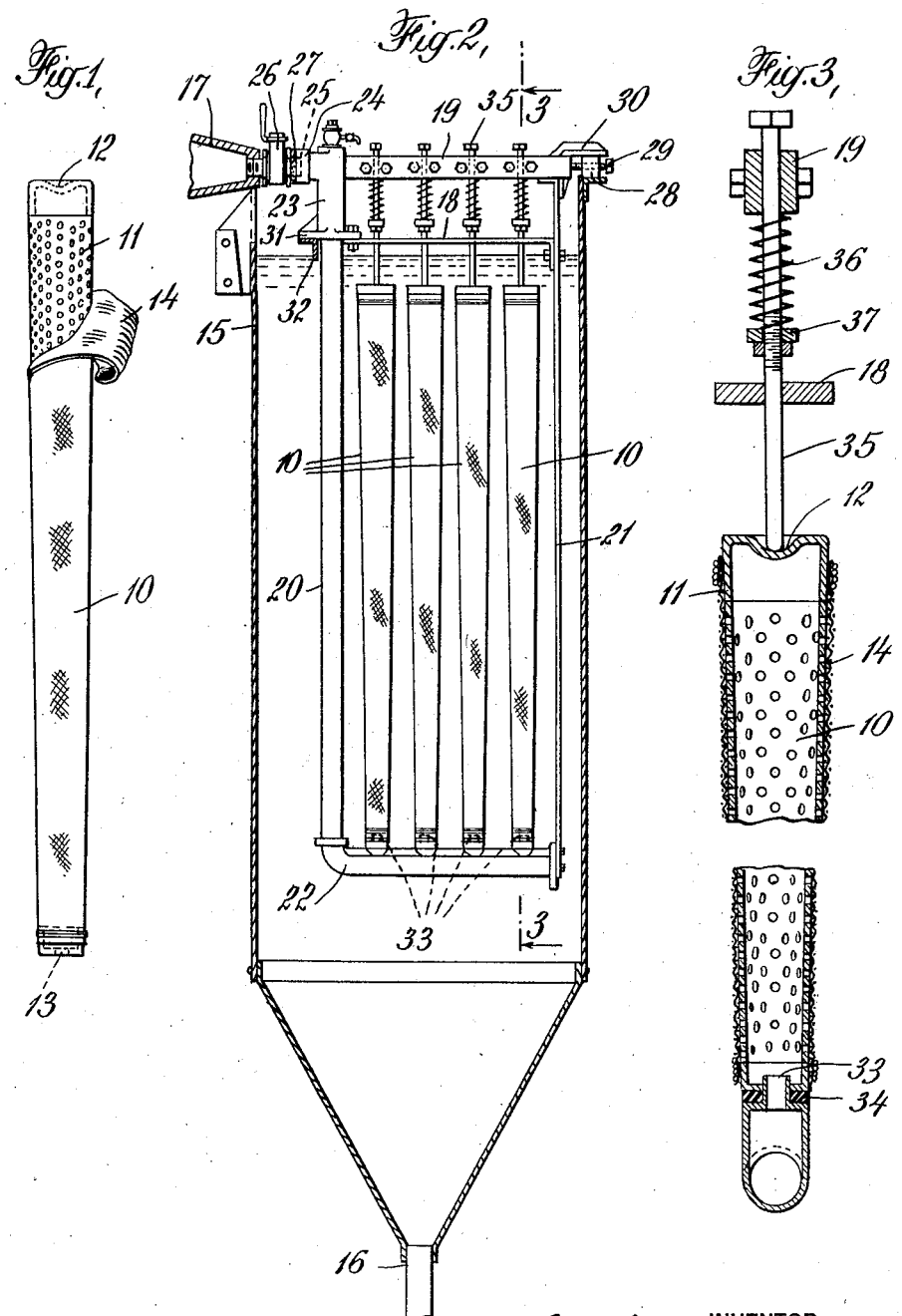

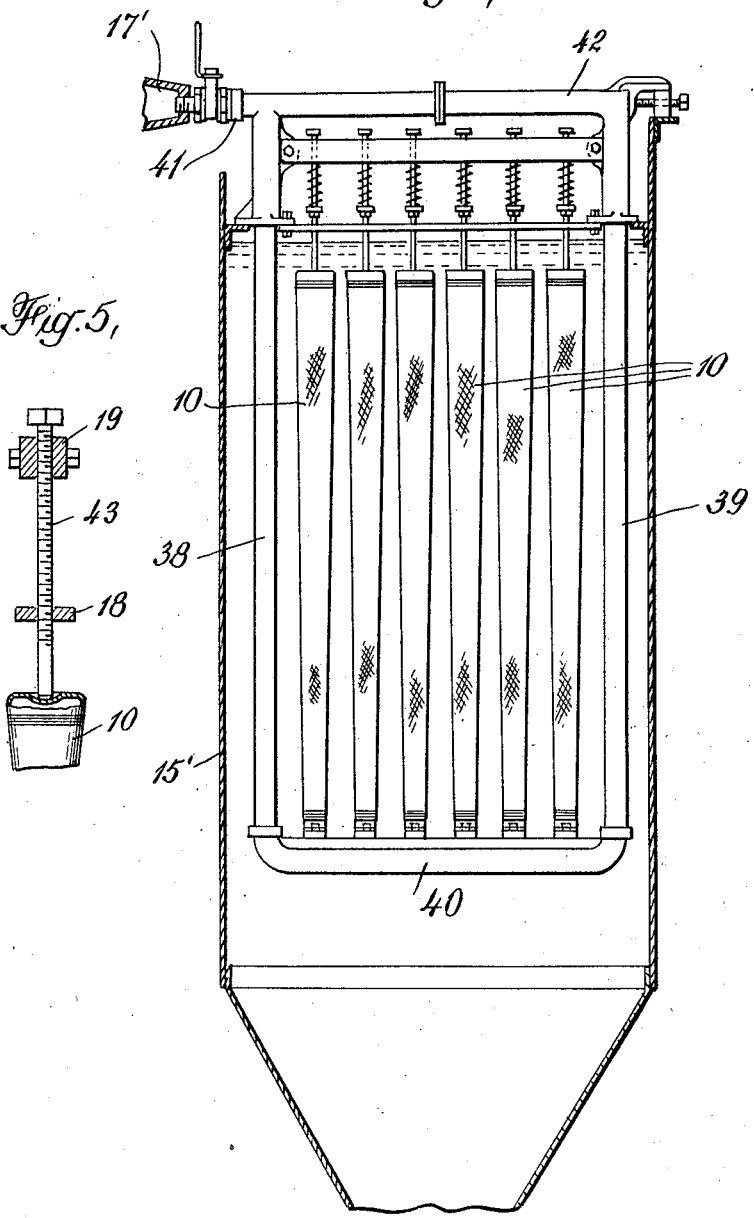

1,706,400

UNITED STATES PATENT OFFICE.

RANDOLPHE W. DIAMOND, OF TRAIL, BRITISH COLUMBIA, CANADA, ASSIGNOR, BY MESNE ASSIGNMENTS, TO GENTER THICKENER COMPANY, A CORPORATION OF DELAWARE.

FRAME FOR HOLDING TUBULAR FILTER ELEMENTS.

Application filed June 10, 1925. Serial No. 36,134.

This invention relates to filtering appartuse of the type wherein one or more hollow filtering elements or bodies are submerged in a mixture to be filtered within a container, and a combined filtering action and thickening action carried on. In apparatus of this type, the filtering elements are connected through suitable fittings to a filtrate collecting chamber by which the filtrate in the interior of the elements is continuously or periodically withdrawn.

The invention has particular relation to the support of the hollow filtering elements and its object is to provide a frame of improved construction for holding one or more hollow filtering elements which also serves to conduct the filtrate to the collecting chamber. The invention also involves an improved form of filtering element. The present invention is adapted to be used in connection with filter-thickeners such as are illustrated in United States Patents Nos. 1,359,162 and 1,379,095, granted to A. L. Genter on November 16th, 1920 and May 24th, 1921 respectively. It is also applicable to other filtering apparatus in which it is desired to periodically remove the filtering elements for repairs or inspection or for revivification of the filter medium, as, for example, by means of steam, hot water or chemical agents.

In the construction employed in these prior patents, the filtering elements are clamped by means of bolts to piping which leads to the filtrate collecting chamber. Although these clamping arrangements previously used perform their function successfully, nevertheless an undesirable amount of inconvenience attends the removal or attachment of the filtering elements.

According to the present invention a frame is provided for supporting one or more hollow filtering elements within the filtration vessel. The frame is removably supported in position to cause the filter elements to dip into the filtration vessel and is provided with a fitting or coupling which is in communication with the interior of the filtrate collecting chamber when the frame is in operative position. The fitting or coupling member is constructed with a liquid and air-tight joint by which this connection with the filtrate collecting chamber is ordinarily made by the act of placing the frame in position, a clamping device being provided on a fixed portion of the filtering apparatus for simultaneously supporting the frame and holding the coupling member in leak-tight engagement with the filtrate collecting chamber.

The improved hollow filtering element comprises a perforated or porous rigid tube closed at the one end which preferably has a socket for assisting in holding the element in place in the frame, and having an outlet opening at its opposite end. This tube furnishes a rigid foundation for a covering of foraminous material such as cloth or fabric.

The frame includes horizontal members rigidly attached to the coupling member and adapted for engagement with the clamping means above mentioned and a horizontally disposed filtrate collecting member or manifold which is supported in spaced parallel relation to the frame members at a distance therefrom which is somewhat greater than the length of the hollow filter elements. The filtrate collecting member or manifold is provided with appropriate coupling means, such, for example as a nipple, which coacts with the outlet opening in the outlet end of each of the hollow filter elements, both to hold the filter element firmly in place within the frame and to form a leak-tight joint with the filter elements. A conduit which preferably constitutes one of the supporting members for the filtrate collecting manifold conducts the filtrate therefrom to the fitting or coupling member which is in communication with the filtrate collecting chamber.

The individual filter elements are engaged at their ends opposite the filtrate outlet by clamping means associated with these opposite horizontal frame members which press the elements downwardly or upwardly according to whether the outlet is on the bottom or top of the frame and force their opposite ends into leak-tight engagement with the filtrate collecting manifold which may be placed at the top or bottom. This clamping means may be merely a member threaded through one of the horizontal frame members, but preferably it consists of a bolt longitudinally slidable in these frame members and spring pressed into the socket provided in the closed end of the filter elements; i. e., opposite to the filtrate outlet end.

The accompanying drawings illustrate by way of example several embodiments of the invention and by considering these drawings in connection with the following description a better understanding of the invention will be obtained. In these drawings, Fig. 1 is a view of one of the improved hollow filter elements with the foraminous covering folded back so as to expose the perforated tube;

Fig. 2 is a vertical section through a portion of a filtering apparatus showing the improved frame, having bottom outlets, in operative position;

Fig. 3 is an enlarged vertical section taken on the line 3—3 of Fig. 2, showing the details of the filtrate connection and sliding bolt arrangement for holding the filter element in place;

Fig. 4 is a view similar to Fig. 2 of a modified frame construction in which both of the vertical frame members are hollow and serve as filtrate conduits;

Fig. 5 is a view of a simple clamping device to take the place of the sliding bolt illustrated in Fig. 3; and Figs. 6 and 7 are views respectively of two other modifications of my improved frame.

Referring to the accompanying drawings, the hollow filtering elements 10 each comprise a rigid foundation 11 which may conveniently consist of a perforated or porous tube of metal or other rigid material. This tube is closed at one end by a cap which may be integral with the body of the tube or separately attached thereto. The cap may have as a socket a depression 12 to facilitate its support in the frame, or it may have a projection that fits into a depression in the spring rod. The tube is provided at its opposite end with a filtrate outlet 13. The outer surface of the tube 11 is covered with an appropriate filtering medium such as the cloth or fabric 14.

The filtering vessel comprises a tank 15 which is provided at the bottom with a mud outlet or sludge discharge 16 and at the top with a filtrate collecting chamber 17. The material to be filtered is fed into the tank 15 through an appropriate conduit (not shown) and the level of the liquid is maintained preferably above the tops of the filter elements 10. Reduced pressure applied to the filtrate collecting chamber 17 by means of a suitable pump produces the filtration by drawing the liquid to be filtered through the filtering media 14 of the filtering elements 10 to the interior of these elements whence it passes to the chamber 17 as will presently be described. The reduced pressure-filtrate collecting chamber 17 is periodically cut off and replaced by a liquid counter current which passes to the interior of the filter elements 10 and dislodges the solids which have collected upon the exterior surfaces of the filter elements 10. These solids fall to the bottom of the tank 15 and are discharged continuously or at intervals through the mud outlet 16. The material within the tank 15 is thereby filtered and thickened at the same time.

In Fig. 2 the improved frame construction of the invention for supporting the filtering elements 10 comprises a pair of upper horizontal members 18 and 19, a pair of vertical members 20 and 21, and a lower cross piece which is preferably made in the form of a filtrate collecting manifold 22.

The upper horizontal member 19 is rigidly secured to a fitting 23 which is provided with a coupling member 24 having a shallow recess for receiving a nipple 25 projecting from valve 26 which is screwed into an opening in filtrate collecting chamber 17. A washer 27 fits over nipple 25 between flat surfaces on coupling member 24 and valve 26 respectively.

At the opposite ends of frame member 19 and also fixed to the tank 15 or other rigid portion of the filtering apparatus there is a member 28 through which there is threaded a bolt 29. By turning up this bolt, it is brought into engagement with the right hand end of member 19 which thereby forces the coupling member 24 against the valve 26 and compresses washer 27, thereby forming a liquid and air-tight joint. At the same time the frame is clamped firmly in operative position. In order, however, to relieve bolt 29 and nipple 25 of some of the weight of the frame and filter elements, the shoulders 30 and 31 may be provided for engagement respectively with the bar 28 and with the support 32.

The vertical member 20 of the frame above referred to is preferably made hollow so as to form a conduit connecting the manifold 22 with the fitting 23. The manifold 22 is provided with a plurality of vertically projecting nipples 33, one for each of the filtering elements 10. The filtrate outlet 13 of each of the filtering members 10 fits over a nipple 33 and a packing washer 34 is inserted between the bottom flat surface of the filtering element and a corresponding flat surface of similar diameter forming a shoulder around nipple 33.

At the top of the frame and slidably mounted in apertures in the horizontal members 18 and 19 there are a plurality of vertically slidable bolts 35 which project below the member 18 a sufficient distance to enter the depressions 12 in the tops of the filtering elements 10. Spiral springs 36 surround bolts 35 and coact with the stationary member 19 and collars 37 rigidly secured to the bolts so as to urge the bolts against the filtering elements with sufficient pressure to compress the washers 34 and form liquid-tight joints between the lower ends of the filter elements and manifold 22.

In the usual filtering apparatus the tank 15 is made of suitable size and shape to accommodate a relatively large number of these filtering element frames and the filtrate collecting chamber 17 is appropriately designed to suit the shape of tank 15 and accommodate all of the frames employed. In the operation of the filtering apparatus, it is occasionally desirable to remove one or more of the filtering elements 10 for inspection or repair or for revivifying the filtering media 14, this revivifying being carried out by washing the filtering medium by steam, hot water or chemical agents. The improved frame of the present invention in which the individual filtering elements 10 are removably supported and which is itself removably connected to the filtrate collecting chamber 17 greatly facilitates this operation.

One or more of the frames can be readily removed from the tank 15 with their attached filtering elements 10. This is done first by closing valve 27 so as to prevent the entrance of air to the chamber 17 when the frame is removed, and then loosening bolt 29 a few turns, after which the frame is slid horizontally so as to clear the nipple 25 and then lift it vertically out of tank 15. This is a simple operation and the same frame can be attached (after new filtering elements 10 have been inserted) with equally as great facility. The simplicity of the coupling construction and the employment of means which is operable simultaneously to connect the coupling connection with chamber 17 and place the frame in operative position aids in simplifying this operation and thus in reducing the time of replacing the filtering elements.

The filtering elements themselves are independently and individually removed from the frame simply by pulling upwardly on the heads of the slidable bolts 35. This immediately releases the lower ends of these bolts from the depressions 12 so that the filtering elements can then be lifted off from their seats on the manifold 22. After the filtering elements 10 have been re-covered, or the covering 14 has been cleansed as above indicated, they are readily and quickly reinserted in position in the frames by the reverse of this operation.

When it is desired to remove the filtering elements 10 and replace them very quickly so as to keep as many as possible of the filtering elements in uninterrupted operation, a number of replacement elements freshly covered or freshly revivified are kept handy and these are merely interchanged with the elements that are in operation within the tank 15. This interchanging of the elements can be accomplished very quickly as will be understood from the above description.

In Fig. 4 there is illustrated a modification of the improved frame construction which will accommodate a larger number of filtering elements 10 than the frame illustrated in Fig. 2. In this modification two filtrate conduits 38 and 39 located respectively on the inner or left hand side of the frame and on the right hand side thereof take the filtrate from the manifold 40. Conduit 38 leads directly to the coupling 41 which is similar to coupling 24 of Fig. 2 and conduit 39 leads up to a cross conduit 42 at the top of the frame which joins conduit 38 near the coupling 41.

Any number of the frames illustrated in Fig. 4 can be arranged within the tank 15 depending upon the size of this tank. The frames are removably connected with the filtrate collecting chamber 17' in a manner similar to that described above in connection with Fig. 2. Also the individual filtering elements 10 are removably held in operative position in the frame and in communication with the filtrate manifold 40 in the manner previously described.

The alternative means for positioning the tops of the filter elements 10 which is illustrated in Fig. 5 may be employed if desired. In this arrangement a bolt 43 is threaded through the cross upper frame member 19 and is braced in an aperture in the member 18. By screwing down bolt 43 against the top of filter element 10, the washer 34 at the bottom of the element is compressed and a liquid-tight joint secured as above described.

In the modified form of filter element frame shown in Fig. 6 the filtrate conduit 44 is arranged centrally of the filter elements 10. This conduit may conveniently consist of a suitable length of pipe threaded at either end into the lower filtrate collecting manifold 45 and the upper horizontal frame member 46. Both the manifold 45 and the member 46 may conveniently be made by casting from any suitable metal and frame 46 will have a passageway poured therein, leading from the upper end of conduit 44 to the coupling 24.

In this modification the manually releasable filter element locking devices are of somewhat different construction than those previously described. In place of the bolt 35 which is slidable through both members 18 and 19 as shown in Figs. 2 and 4, the following arrangement is employed. The frame 46 is provided along the bottom with depending lugs 47, one for each of the filter elements 10 carried by the member 46. Each of these lugs has a vertical bore 48 which may be seen by referring to the left hand lug of Fig. 6 which is shown in section, and in this bore there is freely slidable a rod 49 which is adapted to interlock with the top of filter element 10 by means, for example, of the socket or depression 12. Rod 49 is urged downwardly by the spring 50 which coacts with an enlargement on the rod and with a shoulder on lug 47. The downward movement of the rod 49 is limited by a pin 51 which slides in a slot 52 extending laterally through lug 47. By pulling up on the rods 49 they are released from the upper ends of filter elements 10 which may then be removed from the filter element frame previously described.

The modified form of filter element frame shown in Fig. 7 illustrates the arrangement where the filtrate is removed from the tops of the filter elements 53 instead of from the bottoms. The upper frame member 46 is provided along its lower edge with a plurality of projections having nipples 54 by which a filtrate connection is made with the upper ends of filter elements 53 in a manner similar to that described in connection with the nipples 33 shown in Fig. 2, which connect with the bottoms of filter elements 10. The apertures through each of these nipples 54 connect with a bolted passageway 55 which extends through member 46 so as to conduct the filtrate to the coupling 24.

For supporting the lower ends of filter elements 53 a pair of vertical frame members 56 are bolted or otherwise suitably secured near each end of upper frame member 46. Members 56 carry at the bottom a suitable structure for supporting manually releasable filter element locking devices, such, for example as the bolts 35 shown in Figs. 2 and 4. In this form of the invention it will be seen that the lower ends of the filter elements 53 are closed and provided with a suitable form of socket connection for engagement with the locking devices, and the upper ends of the filter elements have filtrate outlets which are capable of being readily connected or disconnected with the filtrate conduit carried by the frame.

By utilizing the improved filter element and filter element supporting frame of the present invention in a filtering apparatus, and particularly in a filter-thickener, greatly improved operation of the apparatus is afforded. This improved operation appears in the case with which individual filter elements may be removed and replaced in the filter element frame, and individual filter element frames removed and replaced in the filtering container.

I claim:

1. In an apparatus of the character described, a container for liquid to be filtered, a filtrate collecting chamber associated therewith, and a frame for supporting a plurality of hollow filter elements within the container having filtrate connections for one end of the filter elements and slidable spring pressed bolts for engaging the opposite ends thereof.

2. In an apparatus of the character described, a container for liquid to be filtered, a filtrate collecting chamber associated therewith, a frame for supporting a plurality of hollow filter elements within the container provided with means including a nipple for making a filtrate connection with one end of each filter element, and a slidable spring pressed bolt for engaging the opposite end of each filter element for releasably holding the elements in position.

3. In an apparatus of the character described, a container for liquid to be filtered, a filtrate outlet associated therewith, and a frame for supporting a plurality of hollow filter elements within the container having filtrate connections for one end of the filter elements and slidable spring pressed bolts for engaging the opposite ends thereof.

4. In an apparatus of the character described, a container for liquid to be filtered, a filtrate outlet associated therewith, a frame for supporting a plurality of hollow filter elements within the container provided with means including a nipple for making a filtrate connection with one end of each filter element, and a slidable spring pressed bolt for engaging the opposite end of each filter element for releasably holding the elements in position.

5. In an apparatus of the character described, a container for liquid to be filtered, a plurality of filtrate outlets associated therewith, valves for individually opening and closing the filtrate outlets, a plurality of filter element frames each removably supported within the container and each having a coupling for connecting with said outlets, each of said frames having a plurality of hollow filter elements removably mounted therein and a conduit carried by the frame for conveying filtrate from the filter elements to the coupling.

6. In an apparatus of the character described, a container for liquid to be filtered, a filtrate outlet associated therewith, filter element frames with the top and bottom bar members disposed substantially parallel to each other and removably supported within the container and having a coupling for connecting with said outlet, each of said frames having a plurality of hollow filter elements removably mounted therein and a conduit carried by the frame for conveying filtrate from the filter elements to the coupling.

7. In an apparatus of the character described, a container for liquid to be filtered, a filtrate outlet associated therewith, hollow filter element frames disposed in one plane and removably supported within the container and having a coupling connected with said outlet, each of said hollow frames having a plurality of hollow filter elements removably mounted therein and connections between said hollow filter elements and said hollow frames for conveying filtrate from the filter elements to the coupling.

In testimony whereof I affix my signature.

RANDOLPHE W. DIAMOND.